June 11, 1963 W. C. KIRKPATRICK ET AL 3,093,448
ENCAPSULATION OF ELECTRICAL COMPONENTS AND OTHER ARTICLES
Filed Nov. 25, 1959 2 Sheets-Sheet 1

INVENTORS
WYLIE C. KIRKPATRICK
WILLIAM G. BAIRD, JR.
THOMAS E. FORD

BY Cushman, Darby + Cushman
ATTORNEYS

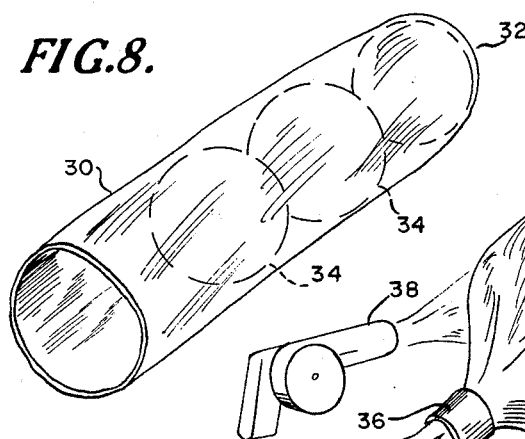
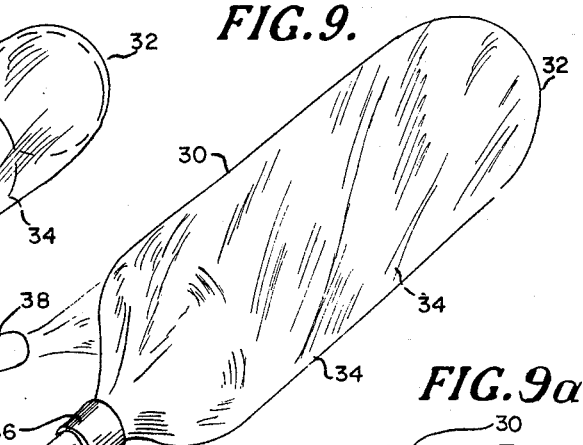
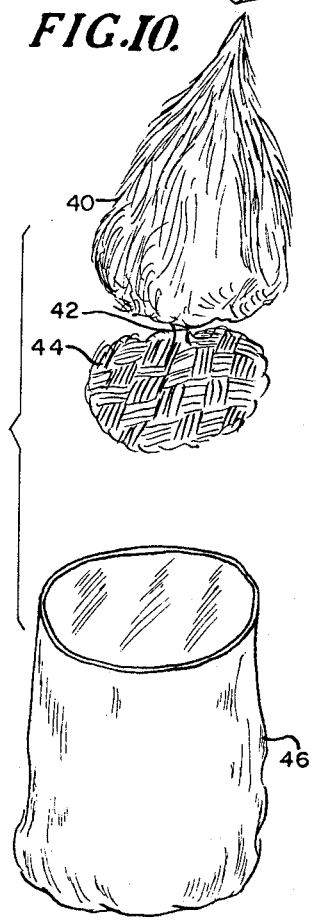
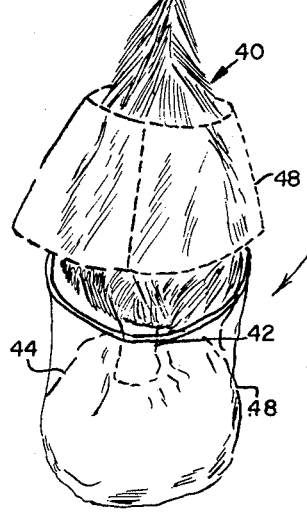
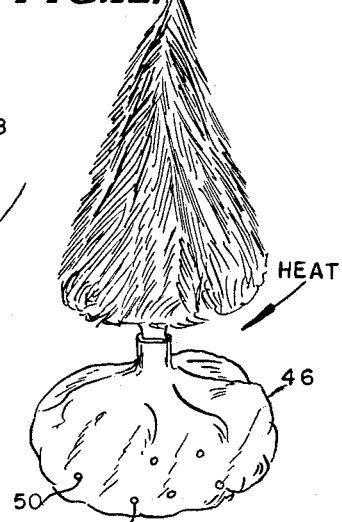
INVENTORS
WYLIE C. KIRKPATRICK
WILLIAM G. BAIRD, JR.
THOMAS E. FORD
BY Cushman, Darby & Cushman
ATTORNEYS

3,093,448
ENCAPSULATION OF ELECTRICAL COMPONENTS AND OTHER ARTICLES

Wylie C. Kirkpatrick, Wayland, William G. Baird, Jr., Winchester, and Thomas E. Ford, Arlington, Mass., assignors to W. R. Grace & Co., Cambridge, Mass., a corporation of Connecticut
Filed Nov. 25, 1959, Ser. No. 855,412
2 Claims. (Cl. 18—59)

The present invention relates to a method of wrapping articles and, more specifically, to an improved method utilizing a heat shrinkable thermoplastic oriented film to provide a tight protective coating for articles.

The use of thin plastic films for providing protective coverings and/or packaging of articles has become quite popular in recent years. However, the methods and the material heretofore used have not been entirely satisfactory for commercial use. The prior practice has been generally to wrap articles in a plastic material which stretches when it is wet and shrinks when it dries or to dip the articles into a plastic in liquid form to provide a tight covering or package. These prior methods have proved expensive and impractical in many instances in that the resulting covering was not strong enough, tight enough or adaptable to articles of irregular shape. Some efforts have been made to use plastic materials having heat shrinkable properties, but these materials normally became tacky when heated for shrinking as they did not have sufficient shrinkability below their plasticizing temperature to provide a tight package or covering. In addition, such heat shrinkable material had a tendency to lose its tear strength when heated and then cooled and, thus, did not provide a sufficiently strong, tough, tight package.

An object of the present invention is to provide a method of wrapping an article or multiple articles in a covering made from oriented heat shrinkable thermoplastic film. The oriented film can either be biaxially stretched or mono-axially stretched so as to provide shrink either in a biaxial direction or a mono-axial direction.

Protective coverings or wrappings have utility in the field of electrical components. For example, electrical components such as condnesers and the like have been encapsulated in oil or wax compounds, the oil or wax compounds being applied over the dielectric materials of the condenser to seal the capacitor sections with only the small wire pigtails extending therefrom.

It is an object of the present invention to provide a method of encapsulating electrical components by utilizing heat shrinkable properties of an oriented thermoplastic film. Ancillary to the foregoing, it will be understood that the heat shrinkable oriented thermoplastic film not only provides an adequate coating and cover but its properties are excellent for use with electrical components as it can stand abrasion and is moisture resistant.

Another example of utilizing the method of the present invention is to encapsulate electrical components comprising a plurality of wires so as to form a covering for a group of wires bunched together which is neat, tight and capable of being moisture and weather resistant. Heretofore, groups of wires in electrical packages have been pulled through non-shrinking plastic tubes but difficulty was encountered in pulling the last few wires through to form the final unit if the unit was to have a tight appearance.

Still a further object of the present invention is to provide a method covering the roots of plants or shrubs when such plants or shrubs are being transported and sold for subsequent transplanting. The wrapping provided by utilization of the method of the present invention provides an effective means of protecting the roots and retaining soil snugly about the roots.

These and other objects of the present invention will appear more fully in the following specification, claims and drawings in which:

Figure 1:
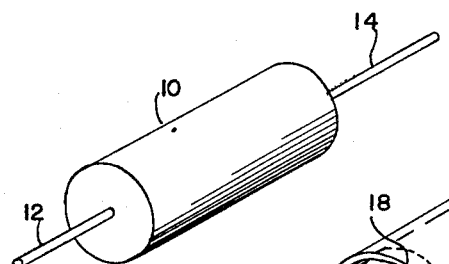
FIGURE 1 is a perspective view of a typical electrical component such as a condenser.
Figure 4:
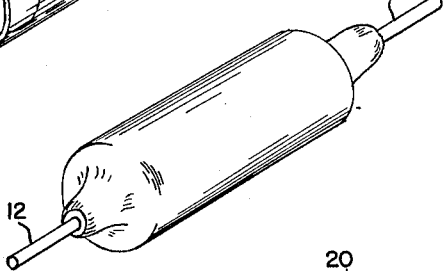
Figure 6:
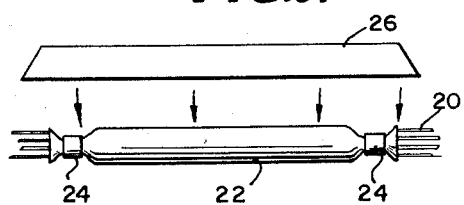
Figure 7:
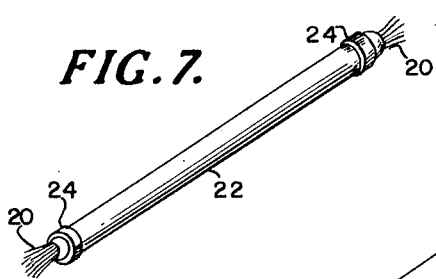
Figure 5:
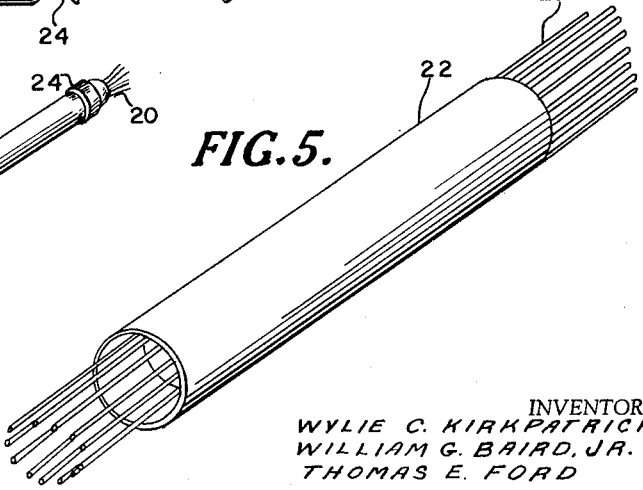

FIGURE 4 discloses a perspective view of the improved encapsulated electrical component of FIGURE 1;

FIGURE 5 is a modified form of the present invention illustrating an electrical component comprising a plurality of wires loosely held in a tube or an envelope of heat shrinkable oriented thermoplastic film;

FIGURE 6 schematically illustrates covering the plurality of wires and applying heat to the covering to shrink the same;

FIGURE 7 discloses the resultant package accomplished by the method of encapsulating an electrical component of FIGURES 5 and 6;

FIGURE 8 is a still further modification of the present invention and shows a tube or envelope of heat shrinkable oriented thermoplastic film loosely applied to a plurality of articles such as golf balls or the like;

FIGURE 9 discloses a perspective view of a further step in the method of providing the finished covering for the plurality of articles of FIGURE 8;

FIGURE 9a illustrates the finished package resulting from the method of the present invention with respect to the article of FIGURE 8;

FIGURE 10 is a still further modification of the present invention and discloses an article such as a plant or shrub being inserted into an envelope or sheet of heat shrinkable oriented thermoplastic material;

FIGURE 11 is a perspective view of the plant after the polyethylene wrapping has been loosely applied thereto; and FIGURE 12 is a view of the plant after the wrapping has been shrunk tightly about the roots.

Referring to the drawings wherein like character and reference numerals represent like or similar parts, the preferred starting material used for the covering of the method of the present invention for wrapping or encapsulating articles is a solid polymer of an olefin having 2 to 3 carbon atoms, i.e. polyethylene and polypropylene. As an example, one such material used was an oriented polyethylene film having a shrink energy in one direction of at least 250 p.s.i. at 96° C. In accomplishing the method of the present invention to produce the novel articles and packages, both monoaxially and biaxially oriented polyethylene was used. The polyethylene was prepared by irradiated Alathon 14 (polyethylene, molecular weight about 20,000, density 0.916) to a dosage of 12 megarad. In the instance where the biaxially oriented film was used, it was stretched 350% in both directions.

In general, however, there is employed in the invention polyethylene film or tubing which has been irradiated to an extent of 2 to 100 megarads, preferably 6 to 20 megarads. The irradiation can be accomplished in conventional fashion, e.g. by the use of a high voltage resonant transformer, such as the 2,000,000 volt General Electric resonant transformer, or high energy particle generators of 50,000 to 50,000,000 volts or a Van de Graaff electron generator. In addition to the use of electrons for irradiating the polyethylene, there can be employed beta rays, gamma rays, e.g. by employing cobalt 60, etc. There can be employed any of the irradiation procedures disclosed in Baird application, Serial No. 713,848, filed February 7, 1958, and now U.S. Patent 3,022,543, or Rainer Patent 2,877,500, for example. The entire disclosure of the Baird application and the Rainer patent is hereby incorporated by reference.

If the film is biaxially oriented, it can normally be carried out to an extent of 100 to 700% longitudinally and 100 to 900% laterally. The biaxial stretching can be carried out by blowing irradiated polyethylene tubing as disclosed in the Baird application. The biaxially oriented polyethylene prepared by such a procedure has a high shrink energy, e.g. 100 to 500 p.s.i. at 96° C. It will be obvious to one skilled in the art that if it is desired to mono-axially orient the film, it can be either done longitudinally or laterally of the film.

There can be employed as a starting polyethylene for the irradiation procedure high, low or medium density polyethylene prepared by low or high pressure technique. The starting polyethylene can have a molecular weight of 7,000 or 12,000 or 19,000 or 21,000 or 24,000 or 35,000 or even higher.

In place of the irradiated polyethylene, as mentioned above, there can be employed similarly irradiated polypropylene. Also, non-irradiated polypropylene may be used. However, in each instance, the polyethylene and the polypropylene must be either mono-axially oriented or biaxially oriented.

FIGURE 1 discloses a typical electrical component such as a condenser 10 having wire pigtails 12 and 14 prior to encapsulation. As shown in FIGURE 1, the condenser is made in its final form but has not been covered with the usual coating of a wax or oil compound.

Figure 2:
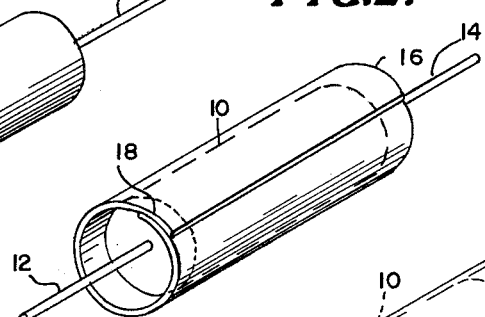
FIGURE 2 is a perspective view similar to FIGURE 1 but showing the condenser wrapped in a piece of heat shrinkable oriented thermoplastic film.

In FIGURE 2, the condenser 10 is disclosed wrapped with a piece of irradiated polyethylene film 16 which has been either mono-axially or biaxially oriented. If the film 16 is mono-axially oriented, then the stretching of the film 16 is in such a direction that when it shrinks, it will shrink about the circumference rather than lengthwise of the condenser. The sheet of film 16 is loosely wrapped around the condenser 10 and is overlapped longitudinally of the condenser as indicated generally at 18. The ends of the film 16 extend beyond the ends of the condenser 10 but not necessarily beyond the ends of the wire pigtails. The overlapped portion 18 of the film 16 is heat sealed so that in effect a tubular sleeve of film is loosely provided around the condenser 10.

Figure 3:
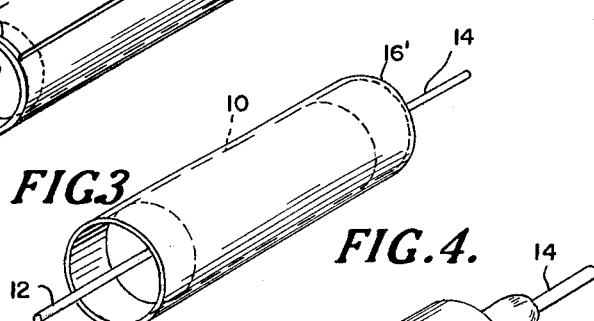
FIGURE 3 is similar to FIGURE 2 but shows a modified form of wrappings made in tubular shape rather than sheet form.

FIGURE 3 discloses the condenser 10 inserted into a seamless tubular sleeve 16' of polyethylene film, the sleeve 16' having a diameter so that it fits loosely on the condenser. In this instance, it will be noted that again the pigtails 12 and 14 extend beyond the ends of the tube 16'.

After the condenser has been wrapped either as shown in FIGURE 2 or 3, the end portions of the film extending beyond the condenser are heated so that they shrink radially inwardly into tight conformity around the wires 12 and 14. As an alternative, the end portions of the film may be actually melted after they have shrunk around the wires 12 and 14 so as to provide an even tighter bonding with the wires 12 and 14.

Once the end portions of the tubing 16 or 16' have been shrunk about the wires 12 and 14, then the body portion of the tubing is heated by a flameless blow torch so as to shrink the body portion into tight conformity with the casing of the condenser 10 as shown in FIGURE 4. By sealing the end portions of the tubes 16 or 16' onto the wires 12 and 14, longitudinal shrink of the body portion is prevented. However, if the film is only mono-axially oriented in a direction normal to the length of the tube then in this instance, there will only be radial shrink of the tube when the body portion is heated.

The resulting condenser as shown in FIGURE 4 is provided with a protective encapsulation which protects the capacitors and dielectric materials of the condenser from abrasion, moisture, dirt and the like.

FIGURES 5 through 7 disclose encapsulating an electrical component such as a group of wires bunched together. Referring first to FIGURE 5, a group of wires 20, each of which may be insulated are arranged in parallel juxtaposition and are loosely surround by a tubing 22 of oriented polyethylene. As shown in FIGURE 5, the ends of the tubing are clamped by metal bands 24 or the like and then the tubing 22 is heated by a suitable source of heat 26 to cause the tubing to shrink tightly around the wires and bunch them together. The bands 24 reduce the lengthwise shrink of the tubing and permits the tubing to shrink only circumferentially.

The resulting package as shown in FIGURE 7 is a group of wires 20 provided with a neat, tight covering which is substantially water proof, dirt proof and abrasive proof. Such a package of wires has utility wherever a group of wires are bundled together. Examples of such use would be in ignition systems of automobiles and airplanes, or telephone systems and the like.

Reference is next made to FIGURES 8 through 9a inclusive, which disclose a modified form of the present invention. In FIGURE 8, an envelope made of biaxially irradiated polyethylene 30 is closed at one end as indicated at 32. A plurality of articles 34 such as golf balls, oranges or the like are placed in the envelope 30 and the open end of the envelope is gathered and heat shrunk so as to seal the same. However, spaces were left in the sealed end to allow air to escape. The end may be closed by wrapping a piece of handling material 36 about the same after it has been gathered as shown in FIGURE 9. After the open end of the envelope has been closed but while it still will permit air to escape from the interior thereof, the film of the envelope is shrunk by utilizing hot air from a hot air blower 38 or the like. The hot air causes the oriented film of the envelope to shrink tightly about the articles 34 and rigidly hold the articles in position relative to one another. Once the body portion of the envelope 30 has been shrunk as shown in FIGURE 9a, the end portion may be heat sealed closed so that air cannot get into the envelope.

Another example of the present invention is disclosed in FIGURES 10 through 12 inclusive. In FIGURE 10, a small shrub 40 having a stem portion 42 and a root portion 44 in a ball of earth is inserted into the envelope 46. The envelope extends upwardly loosely around the ball of earth 44 and is gathered about the stem 42 by twisting the same. A heat shield 48 made of cardboard or the like may be placed over the foliage of the plant and then the envelope 46 is shrunk tightly about the stem 42 by application of heat. After the envelope has been shrunk tightly about the stem 42, hot air, from a suitable blower may be applied over the film of the envelope 46 to tightly shrink the film about the ball of earth 44.

If desirable, apertures 50 can then be provided in the bottom of the film so that moisture may drain from the roots or oxygen and carbon dioxide can pass through to the roots.

In accomplishing the desired results that are set forth in the objects and advantages of the present invention, and as described in detail in the foregoing description, it will be perceived and obvious that the invention is susceptible to some changes and modifications, both as to the method and resulting articles, without departing from the principle and spirit thereof. For this reason, the terminology used in the specification is for the purpose of description and not of limitation, the scope of the invention being defined in the claims.

What is claimed is:

1. A method of encapsulating an electrical component comprising the steps of: placing the electrical component in a tube of oriented film made of a polymer of olefin having 2 to 3 carbon atoms with at least one lead from the component extending out of at least one of the ends of the tube, applying heat locally to the end of the tube having the lead extending therefrom to cause the end to shrink about the lead, then applying additional heat locally to the shrunk end to cause the same to melt and seal about the lead, and then applying heat along the length of the tube causing uni-directional shrinking of the tube about the component.

2. A method of encapsulating an electrical component having at least one lead extending from each end thereof comprising the steps of: placing the electrical component in a tube of oriented film made of a solid polymer of olefin having 2-3 carbon atoms, the tube extending beyond the ends of the component with the leads extending beyond the respective ends of the tube, locally applying heat to each end of the tube to cause the respective ends to shrink about the respective leads so as to prevent longitudinal shrinkage of the tube in a direction along the longitudinal axis of the component, applying sufficient additional heat to the shrunk ends of the tube to cause the same to melt and seal about the respective leads, and then applying heat along the length of the tube to shrink the tube on an axis lateral to the longitudinal axis of the tube to tightly encapsulate the tube about the component.

References Cited in the file of this patent

UNITED STATES PATENTS

| | | |
|---|---|---|
| 1,685,393 | Beadle | Sept. 25, 1928 |
| 2,027,962 | Currie | Jan. 14, 1936 |
| 2,342,977 | Snyder | Feb. 29, 1944 |
| 2,396,712 | Luttge et al. | Mar. 19, 1946 |
| 2,664,358 | Eicher | Dec. 29, 1953 |
| 2,671,889 | Vickery | Mar. 9, 1954 |
| 2,735,970 | Peck et al. | Feb. 21, 1956 |
| 2,865,765 | Allen | Dec. 23, 1958 |
| 2,877,500 | Rainer et al. | Mar. 17, 1959 |
| 2,878,628 | Curry | Mar. 24, 1959 |
| 2,902,795 | Heigl et al. | Sept. 8, 1959 |
| 2,904,943 | Dreyfus et al. | Sept. 22, 1959 |
| 2,989,785 | Stahl | June 27, 1961 |

FOREIGN PATENTS

| | | |
|---|---|---|
| 522,245 | Great Britain | May 29, 1943 |
| 522,473 | Italy | Apr. 7, 1955 |

OTHER REFERENCES

Modern Packaging (Publication), March 1955, pages 100–102. Copy in Div. 67,154—Shrink.